United States Patent
Abouzahr

[11] Patent Number: 6,010,274
[45] Date of Patent: Jan. 4, 2000

[54] METHOD AND APPARATUS FOR ATTACHING A STUD TO A MEMBER

[75] Inventor: Saad M. Abouzahr, Highland, Mich.

[73] Assignee: Chrysler Corporation, Auburn Hills, Mich.

[21] Appl. No.: 08/868,324

[22] Filed: Jun. 3, 1997

[51] Int. Cl.[7] ............................................. F16B 35/00
[52] U.S. Cl. ................... 403/408.1; 403/404; 403/260; 403/271; 403/334; 411/171
[58] Field of Search ............................. 403/404, 408.1, 403/405.1, 334, 333, 337, 270, 271, 260, 258, 256; 411/399, 338, 339, 171, 426; 29/525.11, 525.02

[56] References Cited

U.S. PATENT DOCUMENTS

| | | | |
|---|---|---|---|
| Re. 30,997 | 7/1982 | Briles | 403/405.1 X |
| 700,028 | 5/1902 | Frizell | 403/256 X |
| 2,096,623 | 10/1937 | Almdale | 411/171 X |
| 2,112,594 | 3/1938 | Double | 411/171 X |
| 2,516,472 | 7/1950 | MacKeage, Jr. | 403/404 |
| 2,968,713 | 1/1961 | Harper | 411/171 X |
| 3,594,025 | 7/1971 | Wagner | 403/405.1 X |
| 3,596,948 | 8/1971 | Spoehr | 403/405.1 X |
| 3,921,364 | 11/1975 | Briles | 403/405.1 X |
| 4,115,019 | 9/1978 | Swisher, Sr. | 403/270 |
| 4,370,081 | 1/1983 | Briles | 403/404 |
| 4,600,332 | 7/1986 | Sharp et al. | 411/171 X |
| 4,757,664 | 7/1988 | Freissle | 403/408.1 |
| 5,419,538 | 5/1995 | Nicholas et al. | 403/258 X |
| 5,419,650 | 5/1995 | Hoshino | 403/256 X |
| 5,609,434 | 3/1997 | Yehezkieli et al. | 403/260 |
| 5,689,873 | 11/1997 | Luhm | 29/525.11 |
| 5,700,103 | 12/1997 | Tsai | 403/206 |
| 5,795,118 | 8/1998 | Osada et al. | 411/171 |

*Primary Examiner*—Lynne H. Browne
*Assistant Examiner*—John R. Cottingham
*Attorney, Agent, or Firm*—James R. Yee

[57] ABSTRACT

A method and apparatus for attaching a steel stud to an aluminum member is disclosed. An aluminum member comprising a bore is provided, along with a steel stud, the stud comprising a tapered portion. An aluminum collar comprising a tapered bore for receiving the tapered portion of the stud is provided and placed proximate to the member such that the bores are aligned. The collar is secured to the member, via tack welding and the stud is inserted through the collar and the member such that the tapered portion of the stud engages with the tapered bore of the collar. A device is then attached to the end of the stud.

18 Claims, 2 Drawing Sheets

METHOD AND APPARATUS FOR ATTACHING A STUD TO A MEMBER

BACKGROUND OF THE INVENTION

1. Field of the Invention

This invention relates to a method and apparatus for attaching studs to other members and, more particularly, to a method and apparatus for attaching steel studs to aluminum members.

2. Description of the Related Art

Fasteners called studs typically are used to attach various devices to other members such as the body, frame or sheet metal of a vehicle. Such devices may include but are not limited to harnesses, body hardware, and various chassis components. A typical vehicle has over one hundred such studs. Steel studs are preferred for their strength and typically are welded directly to the member to which the device is to be attached.

With the advent of the use of aluminum to manufacture products such as automobiles, it has become desirable to use steel studs to attach devices to aluminum members. Steel studs currently cannot be welded to aluminum members. Various methods have been used to attach steel studs to aluminum members, such as welding the steel stud to a steel plate, which then is riveted to the aluminum, a redundant and costly design. Another method that has been used is to hand install threaded steel inserts (riv-studs) into the aluminum member, with the stud then screwed into the insert, a very labor intensive process. Both methods are very costly and inefficient, and the need exists for a solution to the problems presented by these methods.

SUMMARY OF THE INVENTION

Accordingly, it is an object of the present invention to provide an improved apparatus and method for attaching steel studs to aluminum members that overcomes these problems, namely, a simple, inexpensive method and apparatus for attaching a steel stud to an aluminum member.

The present invention achieves this object and others by providing an apparatus and method not found in the prior art.

Disclosed and claimed herein is a method and apparatus for attaching a steel stud to an aluminum member. The method comprises the steps of providing an aluminum member having a bore, providing a steel stud having a tapered portion, providing an aluminum collar having a tapered bore for receiving the tapered portion of the stud, positioning the collar proximate to the member such that the bores are aligned, securing the collar to the member such as by tack welding, and inserting the stud through the collar and the member after the collar is secured to the member such that the tapered portion of the stud engages with the tapered bore of the collar. The stud is used to fasten the device to the member.

The discussed and other features and advantages of the present invention, will be more fully understood from the following detailed description of the invention taken together with the accompanying drawings:

DESCRIPTION OF THE DRAWINGS

For a more complete understanding of this invention, reference should be made to the embodiments illustrated in greater detail on the accompanying drawings by way of example only. In the drawings.

DETAILED DESCRIPTION OF THE INVENTION

Figure 1:
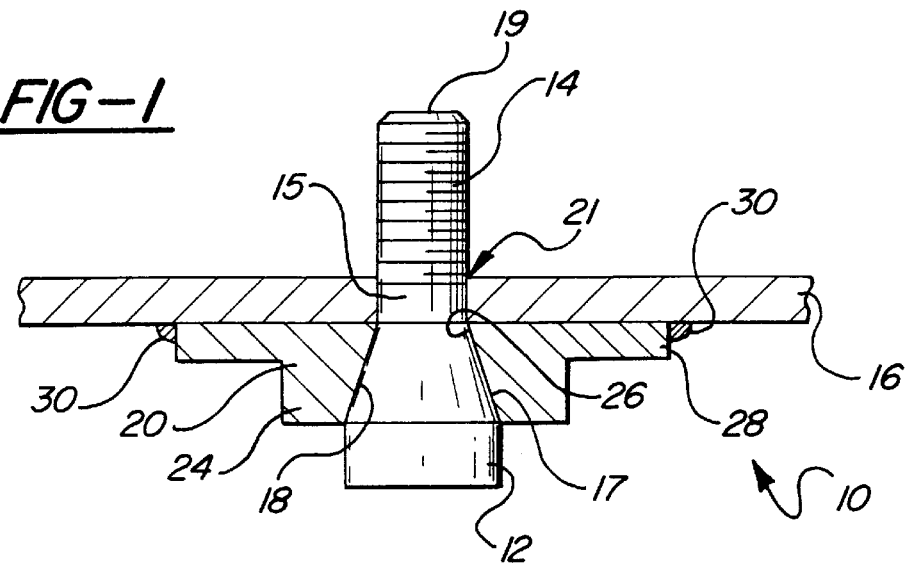
FIG. 1 is a cross-sectional view of the apparatus of the present invention.
Figure 2:
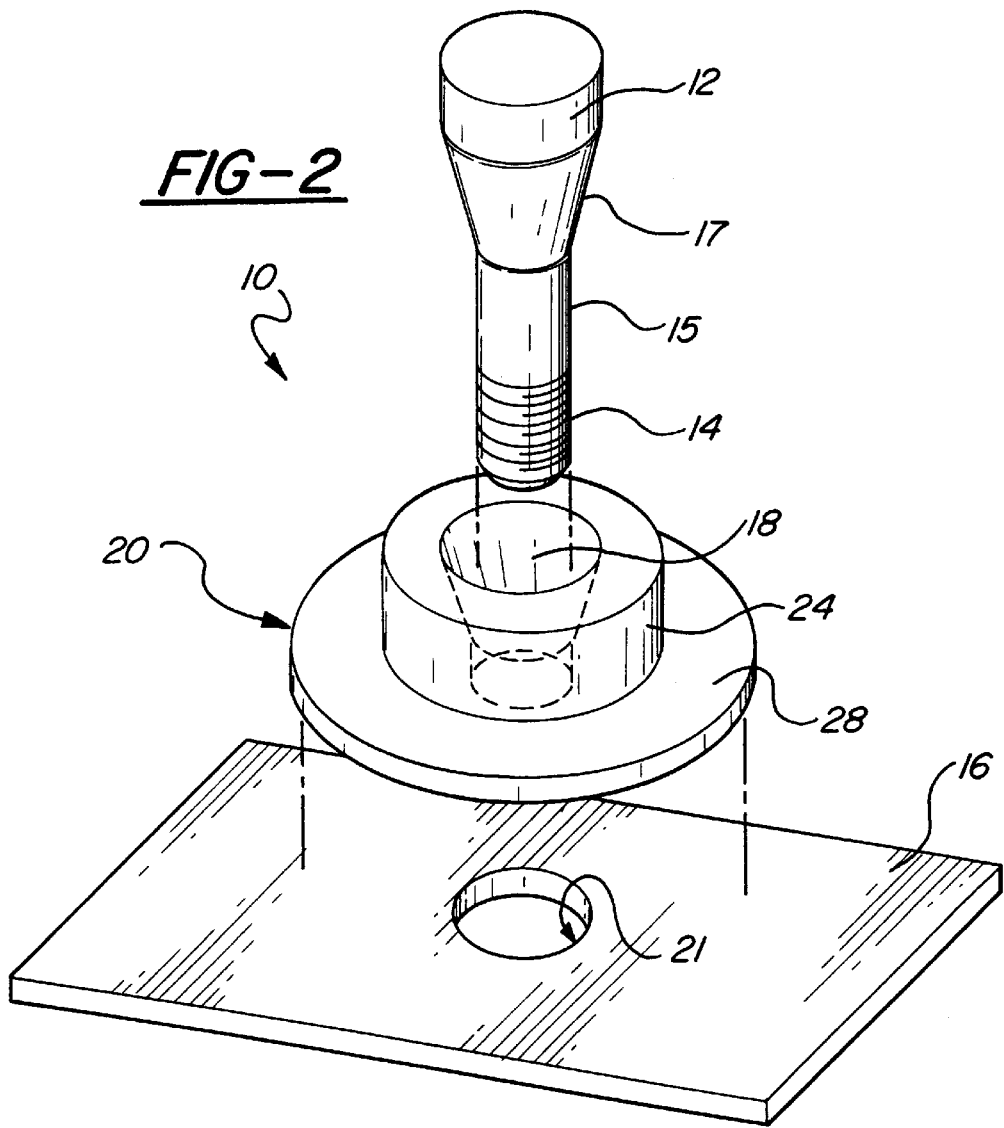
FIG. 2 is an exploded perspective view of the apparatus of the present invention.
Figure 3:
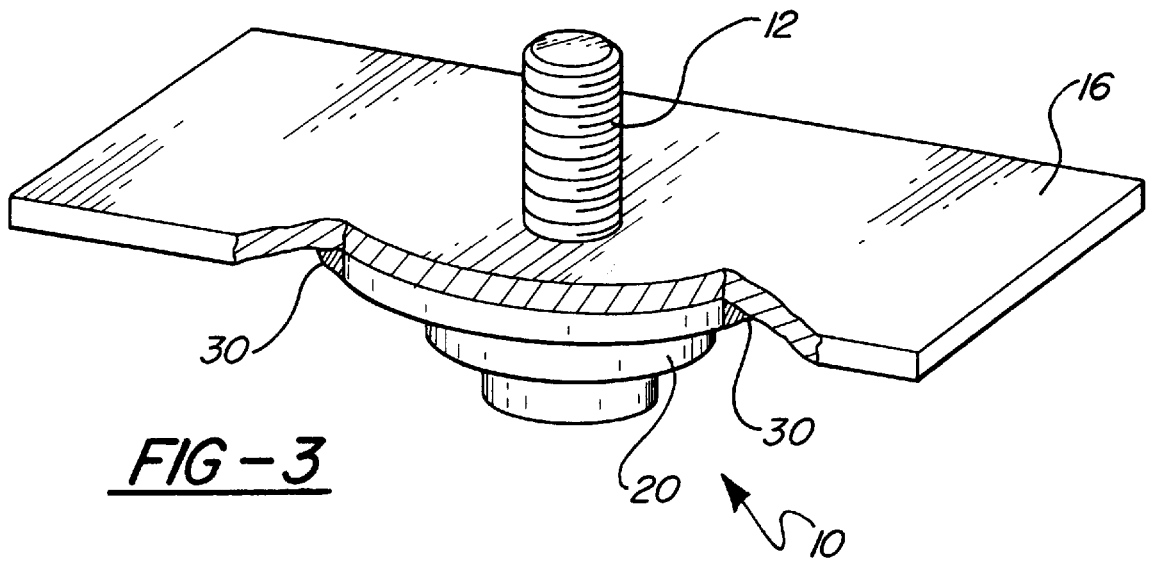
FIG. 3 is a perspective view of the assembled apparatus of the present invention.

Turning to FIG. 1, FIG. 2, and FIG. 3, attaching means 10 is shown. The attaching means comprises stud 12, which preferably is steel but may be any material to which application of the apparatus and method of the present invention is desirable. Stud 12 is shown comprising threads 14 but need not do so, depending on the desired application. Stud 12 is used to attach aluminum member 16, which may be an automobile body panel or frame or other appropriate member, to devices such as wiring harnesses, brackets, trim, or other hardware. A typical stud diameter is 2–10 mm. Stud 12 further comprises shaft 15 and tapered portion 17.

The apparatus of the present invention further comprises bore 18 defined by member 16 for receiving shaft 15 of stud 12. The apparatus of the present invention further comprises collar 20 which preferably is an aluminum extrusion may be of any other suitable construction. Collar 20 preferably comprise cylindrical portion 24 which defines tapered bore 18 for receiving portion 17 of stud 12, and which connects through to annular portion 28. Tapered bore 18 connects through to straight bore 26 which receives the shaft 15 and which is defined by annular portion 28.

According to the method of the present invention, collar 20 first is connected by any suitable method to member 16. Preferably collar 20 and member 16 are placed proximate each other and tack welded by known technology via tack weld 30 to member 16. Bores 21 and 18 are aligned prior to welding. Stud 12 is then pulled through collar 20 and member 16 such that tapered portion 17 of stud 12 engages tapered bore 18 and is held in place, via forced frictional contact. Shaft 15 passes through member 16. A device is then secured to end 19 of the stud which protrudes through the member, by engagement with threads or via other suitable connection means. Engagement of the device with the end of the stud further pulls tapered portion 17 into forced frictional contact with bore 18 and further secures the stud in place within the bore.

Figure 4:
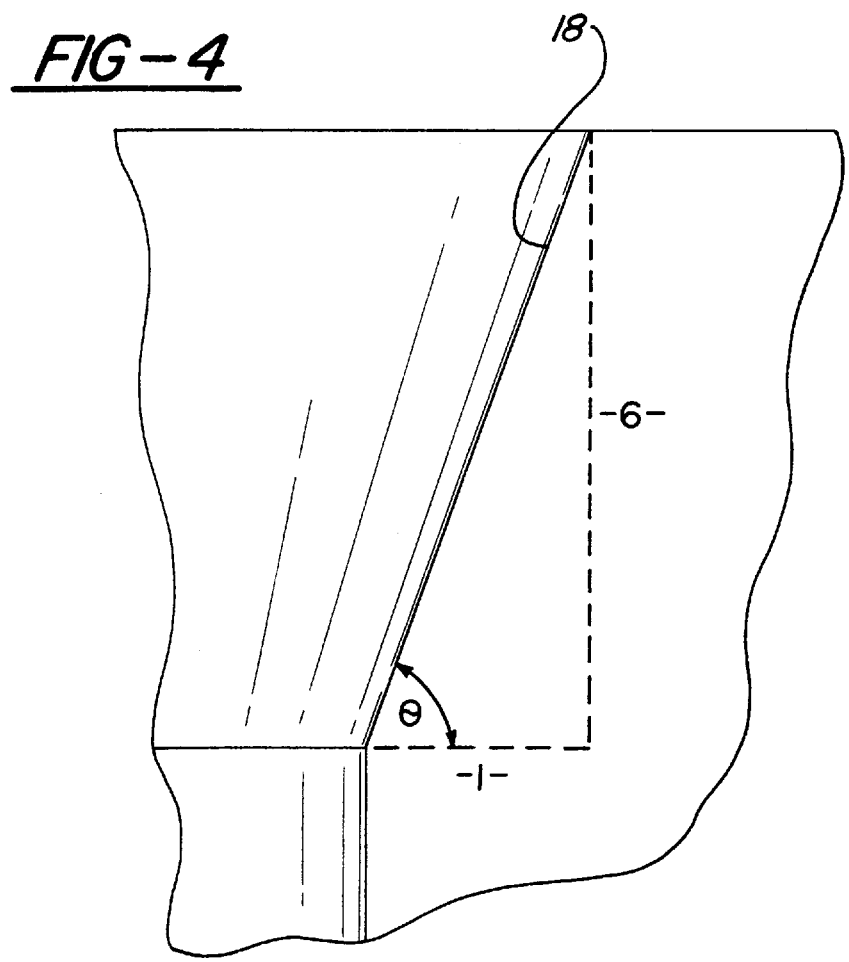
FIG. 4 is a schematic view of the preferred dimensions of the apparatus of the present invention.

The preferred amount of taper in bore 18 is a taper angle of 6-to-1, 8-to-1, or 12-1, but the taper angle may vary from 1-to-1 to 20-to-1. FIG. 4 shows a taper angle of 6-to-1, with angle defined by a 6-to-1 taper, and where $\ominus = \arctan 6/1 = 80°$.

These and other alternatives are considered equivalents and within the spirit and scope of the claimed invention.

What is claimed is:

1. A method for attaching a stud to a member comprising the sequential steps of:

provideing a member having a first planar surface opposite a second surface and including a bore having a first diameter formed therethrough;

providing a stud having a tapered portion;

providing a collar having a cylindrical portion including a first surface and an annular portion integrally formed with said cylindrical portion and radially extending therefrom, said annular portion including a second planar surface opposite said first surface of said cylindrical portion, and a bore formed therein including a straight bore portion formed in said annular portion with a diameter substantially equal to said first diameter of said bore of said member and a tapered bore portion formed in said cylindrical portion for receiving said tapered portion of said stud;

positioning said collar proximate said member such that said second planar surface abuttingly engages said first planar surface of said member and said bores are aligned;

securing said collar to said member at a perimeter of said collar; and inserting said stud through said collar and said member after said collar is secured to said member such that said tapered portion of said stud engages said tapered bore portion of said collar;

wherein said stud is steel and said member is aluminum.

2. The method of claim 1 wherein said tapered bore portion includes a taper angle in the range of 1-to-1 to 20-to-1.

3. The method of claim 1 wherein said tapered bore portion includes a taper angle of 6-to-1.

4. The method of claim 1 wherein said tapered bore portion includes a taper angle of 8-to-1.

5. The method of claim 1 wherein said tapered bore portion includes a taper angle of 12-to-1.

6. The method of claim 1 wherein said collar comprises an extrusion.

7. The method of claim 1 wherein said attaching of said collar is done by tack welding.

8. The method of claim 1 further comprising the step of attaching a device to said stud.

9. An apparatus comprising:

a member having a first planar surface opposite a second surface and including a bore having a first diameter formed therethrough;

a stud having a tapered portion;

a collar having a cylindrical portion including a first surface and an annular portion integrally formed with said cylindrical portion and radially extending therefrom, said annular portion including a second planar surface opposite said first surface of said cylindrical portion, and a bore formed therein including a straight bore portion formed in said annular portion with a diameter substantially equal to said first diameter of said bore of said member and a tapered bore portion formed in said cylindrical portion for receiving said tapered portion of said stud, said collar being secured to said member at a perimeter of said collar independently from said stud such that said second planar surface abuttingly engages said first planar surface of said member and said bores are aligned; and said stud inserted through said collar and said member such that said tapered portion of said stud engages said tapered bore portion of said collar;

wherein said stud is steel and said member is aluminum.

10. The apparatus of claim 9 wherein said tapered bore portion includes a taper angle in the range of 1-to-1 to 20-to-1.

11. The apparatus of claim 9 wherein said tapered bore portion includes a taper angle of 6-to-1.

12. The apparatus of claim 9 wherein said tapered bore portion includes a taper angle of 8-to-1.

13. The apparatus of claim 9 wherein said tapered bore portion includes a taper angle of 12-to-1.

14. The apparatus of claim 9 wherein said collar comprises an extrusion.

15. The apparatus of claim 9 wherein said collar is tack welded to said member.

16. The apparatus of claim 9 further comprising a device attached to said stud.

17. An apparatus comprising:

a member having a first planar surface opposite a second surface and including a bore having a first diameter passing therethrough;

a stud having a shaft and a tapered portion, said shaft passing through said bore; and a collar including a cylindrical portion having a first surface and an annular portion integrally formed with said cylindrical portion and radially extending therefrom, said annular portion having a second planar surface opposite said first surface of said cylindrical portion, said second planar surface abuttingly engaging said first planar surface of said member and being welded directly to said member at a perimeter of said collar, said collar having a bore formed therein including a straight portion formed in said annular portion with a diameter substantially equal to said first diameter of said bore of said member and a tapered portion formed in said cylindrical portion matingly receiving said tapered portion of said shaft, said stud frictionally maintained in engagement with said collar.

18. The apparatus of claim 17, wherein said stud is steel and said member is aluminum.

* * * * *